United States Patent
Hou et al.

(10) Patent No.: US 7,668,976 B2
(45) Date of Patent: Feb. 23, 2010

(54) CONTROL METHOD AND COMPUTER SYSTEM UTILIZING THE SAME

(75) Inventors: Chih-Jen Hou, Taipei Hsien (TW); Hsin-Teng Fu, Taipei Hsien (TW); Fu-Hsing Chen, Taipei Hsien (TW); Tai-Li Lin, Taipei Hsien (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 174 days.

(21) Appl. No.: 11/889,405

(22) Filed: Aug. 13, 2007

(65) Prior Publication Data

US 2008/0301331 A1    Dec. 4, 2008

(51) Int. Cl.
*G06F 3/00* (2006.01)

(52) U.S. Cl. ............................................. 710/8; 713/1

(58) Field of Classification Search ........................ None
See application file for complete search history.

(56) References Cited

U.S. PATENT DOCUMENTS

| 5,522,076 A | 5/1996 | Dewa et al. |
| 5,978,855 A | 11/1999 | Metz et al. |
| 6,175,919 B1 * | 1/2001 | Ha .............................. 713/100 |
| 7,506,208 B2 * | 3/2009 | Bang ........................... 714/36 |
| 2003/0126511 A1 | 7/2003 | Yang et al. |
| 2003/0172372 A1 | 9/2003 | Crisan et al. |
| 2005/0081090 A1 | 4/2005 | Lin |
| 2005/0240919 A1 | 10/2005 | Kim et al. |

FOREIGN PATENT DOCUMENTS

| DE | 10 2004 013 639 A1 | 10/2005 |
| GB | 2 383 151 A | 6/2003 |

OTHER PUBLICATIONS

Huynh et. al, "Method for Storing and Updating Power on Self Test and Basic Input/Output Code," IBM Technical Disclosure Bulletin, vol. 36, No. 09A, Sep. 1993, pp. 561-562.

* cited by examiner

*Primary Examiner*—Eron J Sorrell
(74) *Attorney, Agent, or Firm*—Birch, Stewart, Kolasch & Birch, LLP

(57) ABSTRACT

A computer system comprising a memory module, a connection port, and a central processing unit (CPU) is disclosed. The memory module stores a main base input/output system (BIOS) comprising an auxiliary function. The connection port is capable of connecting an auxiliary module comprising at least one specific program. The CPU executes the main BIOS when the auxiliary function is de-activated. The CPU executes the specific program when the auxiliary function is activated.

21 Claims, 4 Drawing Sheets

CONTROL METHOD AND COMPUTER SYSTEM UTILIZING THE SAME

BACKGROUND OF THE INVENTION

1. Field of the Invention

The invention relates to a control method, and more particularly to a control method executing a specific program.

2. Description of the Related Art

With technological development, computers have become an important piece of hardware in recent years. For a computer, a motherboard (MB) is a major component. The MB comprises at least a central processing unit (CPU), a memory chip and slots connecting interface cards. The components are protected by a case. The computer utilizes a power supply to supply operational power.

The CPU is also known as micro-processor. A basic structure of the CPU comprises an arithmetic logic unit (ALU) and a control unit. Although the CPU is the result of high-tech science, the operations executed by the CPU are simplistic. Despite simplistic operations, the CPU processing speed is fast and the processing results are accurate. The CPU operates all computer peripheral devices and systems according to a basic input/output system (BIOS) stored in a memory chip.

Generally, MB companies provide updated BIOS on their websites. An experienced user can update required versions of BIOS via the network. For inexperienced users however, complications and difficulties arise, in which inexperienced users are not able to successfully update required BIOS.

BRIEF SUMMARY OF THE INVENTION

Computer systems are provided. An exemplary embodiment of a computer system comprises a memory module, a connection port, and a central processing unit (CPU). The memory module stores a main base input/output system (BIOS) comprising a auxiliary function. The connection port is capable of connecting an auxiliary module comprising at least one specific program. The CPU executes the main BIOS when the auxiliary function is de-activated. The CPU executes the specific program when the auxiliary function is activated.

Control methods are provided. An exemplary embodiment of a control method for a computer system comprising a main BIOS comprising an auxiliary function and a connection port connecting an auxiliary module comprising at least one specific program is described as follows. The main BIOS is executed. The auxiliary function is detected. The specific program is executed when the auxiliary function is activated.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
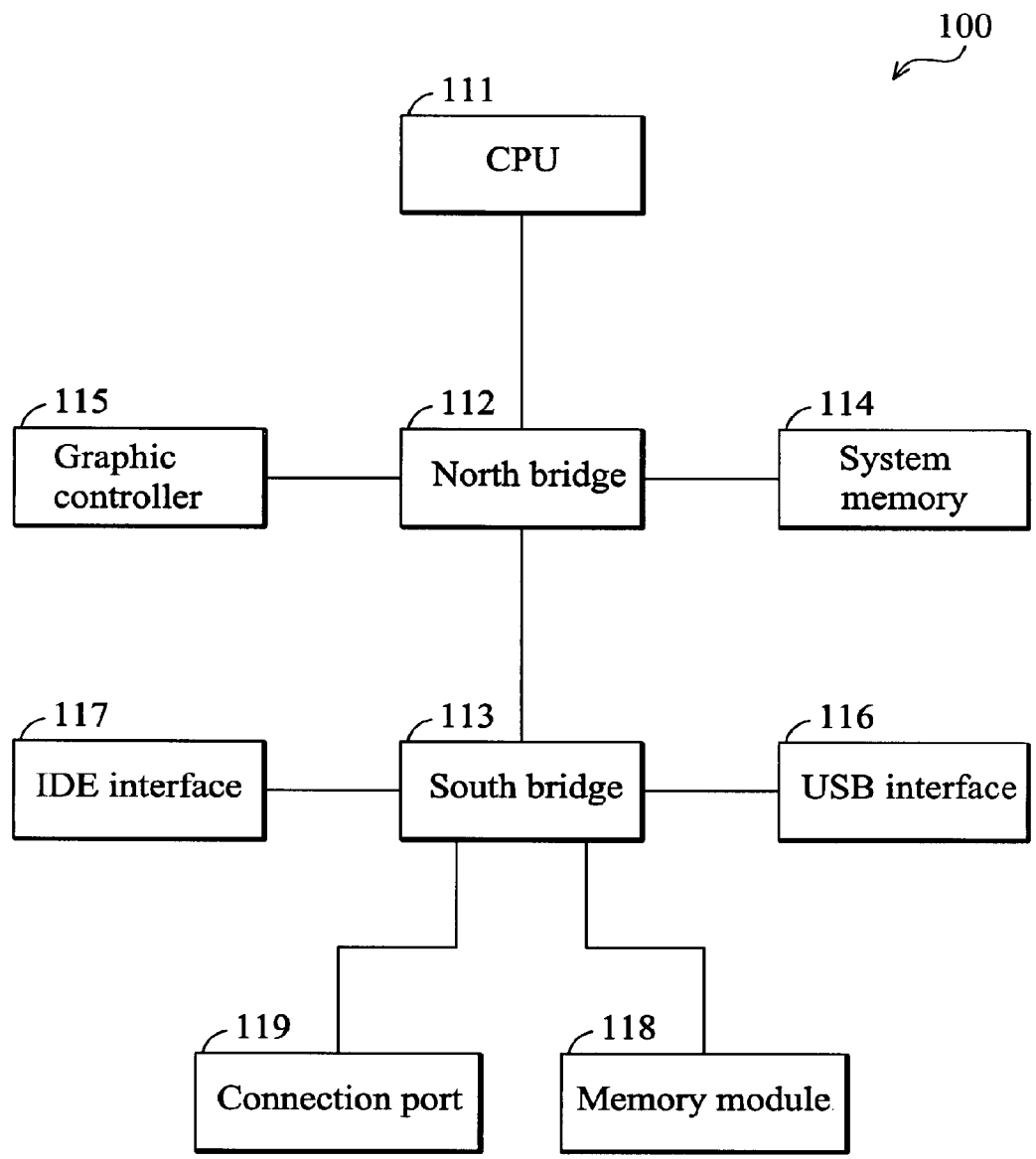
FIG. 1 is a schematic diagram of an exemplary embodiment of a computer system.

FIG. 1 is a schematic diagram of an exemplary embodiment of a computer system. Computer system 100 comprises a central processing unit (CPU) 111, a north bridge 112, a south bridge 113, a system memory 114, a graphic controller 115, a universal serial bus (USB) interface 116, an integrated drive electronics (IDE) interface 117, a memory module 118, and a connection port 119. North bridge 112 functions as a central connecting port to CPU 111, system memory 114, graphic controller 125, and south bridge 113. North bridge 112 transmits data by indirectly connecting to USB interface 116, IDE interface 117, memory module 118, or connection port 119 via south bridge 113. Memory module 118 stores the main base input/output system (BIOS). Connection port 119 is capable of connecting to an auxiliary module comprising a specific program. North bridge 112, south bridge 113, system memory 114, graphic controller 115, USB interface 116, and IDE interface 117 are well known to those skilled in the field, thus, detailed description hereafter is omitted.

After computer system 100 receives operational power, CPU 111 executes a booting action according to the main BIOS stored in memory module 118. If a connection device of the auxiliary module is connected to connection port 119 and an auxiliary function of the main BIOS is activated, CPU 111 to continue executing the booting action according to the specific program of the auxiliary module. In this embodiment, the auxiliary function of the main BIOS is activated by a user. In some embodiments, if CPU 111 cannot execute the booting action according to the main BIOS, the auxiliary function is automatically activated such that CPU 111 continues to execute the booting action according to the specific program stored in the auxiliary module.

When CPU 111 finishes the booting action according to the main BIOS stored in memory module 118, an office system, such as Windows, is loaded. When CPU 111 finishes executing the specific program stored in the auxiliary module, another office system, such as LINUX, is loaded. In another embodiment, the same office system, such as Window is loaded after CPU 111 finishes executing the specific program.

The auxiliary module comprises a slot. A memory chip, such as flash memory chip is inserted into the slot. The memory chip stores the specific program. In the embodiment, when CPU 111 executes the specific program, computer system 100 automatically updates a new version of the main BIOS through a network. In another embodiment, when CPU 111 executes the specific program, CPU 111 automatically detects whether or not the computer system 100 is in a normal state. If the computer system 100 is in an abnormal state, the auxiliary module identifies the abnormal state by issuing a notice signal via speaker (not shown), or monitor display (not shown).

The amount of slots in the computer are not limited. As such, the more slots the computer has, the more memory chips comprising specific programs can be inserted into the slots. For example, different memory chips can store different specific programs such that various functions are executed by the auxiliary module. Assume the auxiliary module comprises a first slot and a second slot with a first memory chip and a second memory, respectively. Since the first and the second memory chips respectively store a first program and a second program, CPU 111 executes corresponding functions according to the first and the second programs. Meanwhile, specific programs can comprise a system loading program, a system program, or an application program.

For example, assume the first specific program for the computer system 100 is to automatically update a new version of the main BIOS. Meanwhile, the second specific program for the computer system 100 is to automatically detect whether or not the computer system 100 is in a normal state. In one embodiment, the CPU 111 can determine which specific program to execute by priority of the first and second memory chips, wherein the CPU 111 can execute the updating function and then the detection function or execute the detection function and then the updating function.

Additionally, when CPU 111 cannot finish the booting action according to the main BIOS, the auxiliary function is automatically activated. Because the auxiliary module comprises a sub-BIOS, CPU 111 continues to operate and executes the booting action according to the specific program stored in the auxiliary module. Thus, the specific program stored in the auxiliary module replaces or repairs the main BIOS stored in memory module 118 such that the booting action can always be completed.

Figure 2:
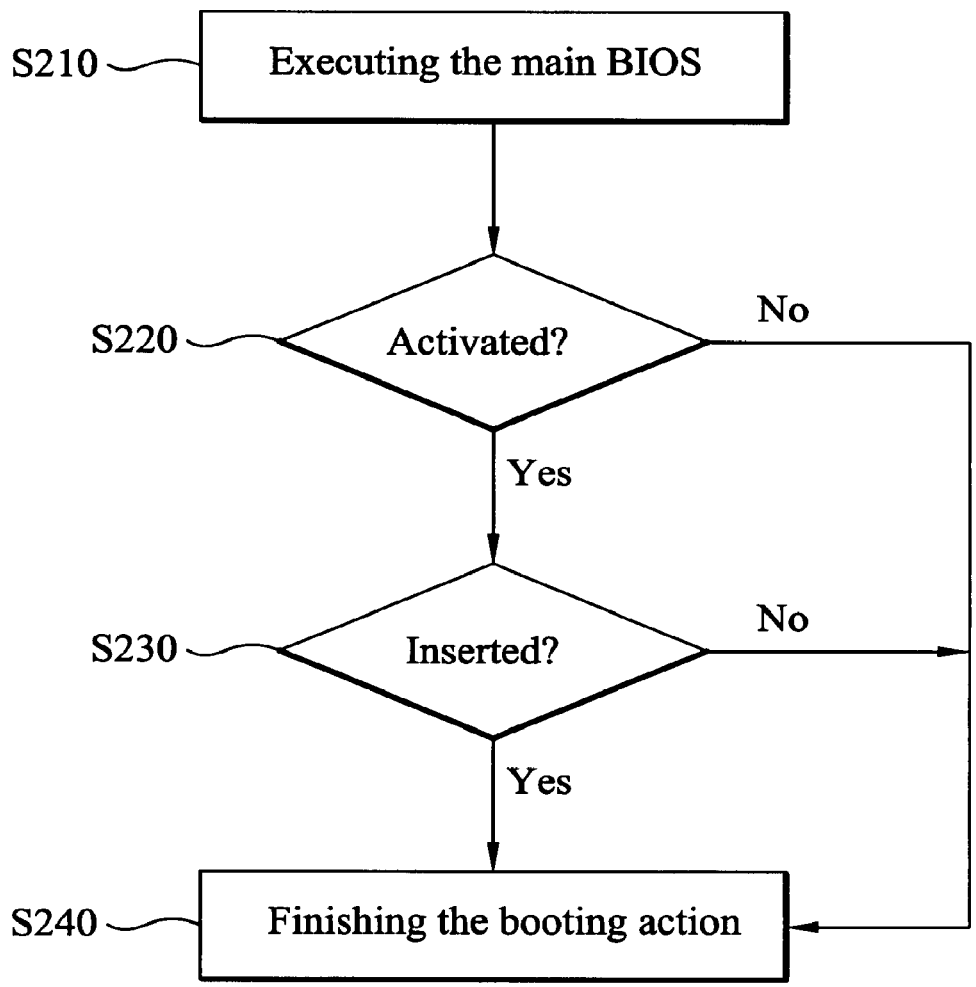
FIG. 2 is a flowchart of an exemplary embodiment of a control method.

FIG. 2 is a flowchart of an exemplary embodiment of a control method. The control method is applied in a computer system. The computer system comprises a main BIOS and a connection port. The main BIOS comprises an auxiliary function. The connection port is capable of connecting to an auxiliary module comprising a specific program.

First, when a power switch of the computer system is turned on, the main BIOS is executed (step S210). The computer system executes the related functions according to the main BIOS. The auxiliary function is detected (step S220). If the auxiliary function is de-activated, the CPU of the computer system finishes the booting action according to the main BIOS (step S240). When the auxiliary function is activated, the connection port is detected (step S230). If the auxiliary module is not inserted into the connection port, the CPU finishes booting action according to the main BIOS (step S240).

If the auxiliary module is inserted into the connection port, the CPU finishes the booting action according to the specific program (step S240). When the CPU finishes the booting action according to the specific program, the main BIOS is updated via network or the computer system is detected. In some embodiments, the specific program comprises the updating function and the detection function. The computer system can additionally execute other functions by specific programs.

Figure 3:
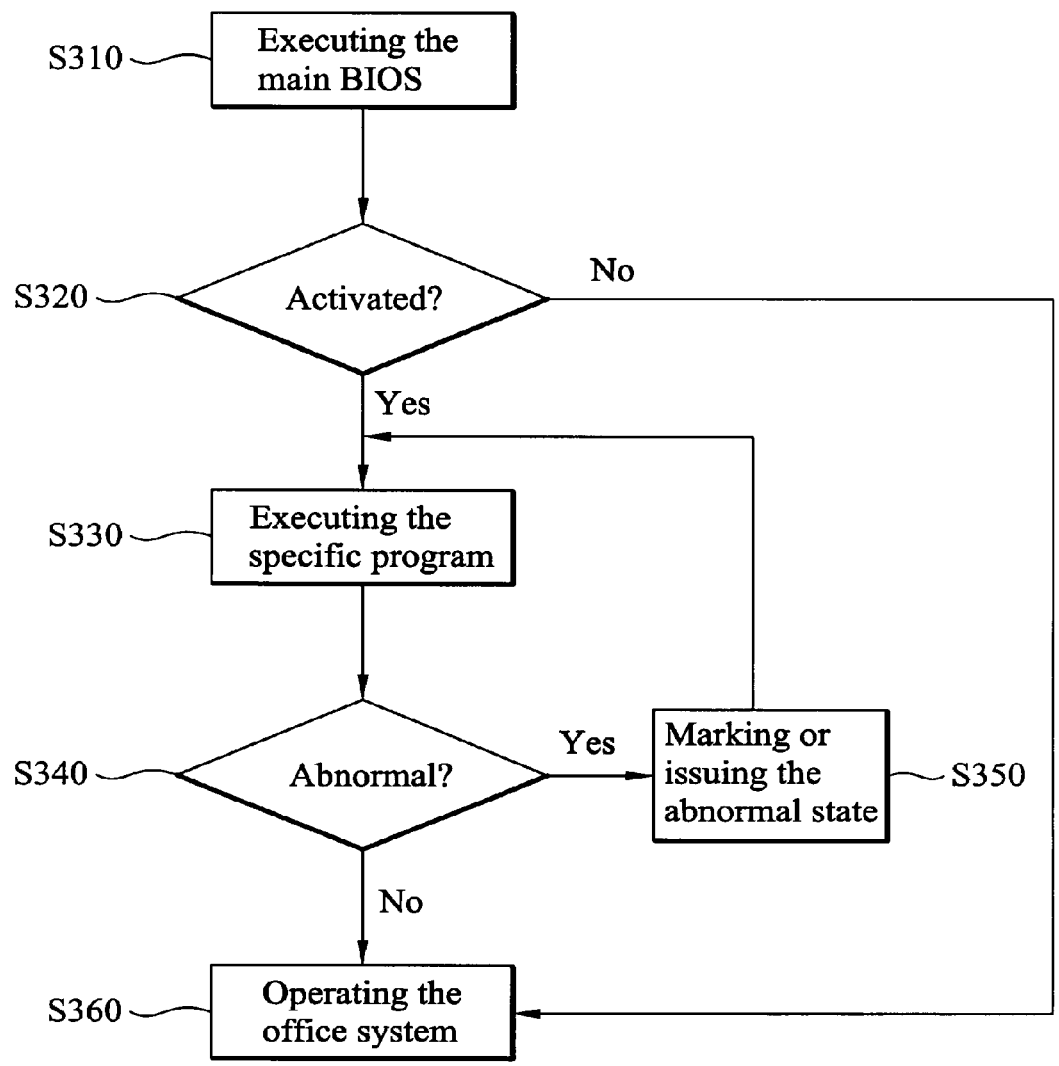
FIG. 3 is a flowchart of another exemplary embodiment of the control method.

FIG. 3 is a flowchart of another exemplary embodiment of the control method. When the power switch of the computer system is turned on, the main BIOS is executed (step S310). When the main BIOS is executed, the auxiliary function is detected (step S320). In this embodiment, the auxiliary function is activated by a user. In some embodiments, when the main BIOS is executed, the auxiliary function is automatically activated. Additionally, in one embodiment, the auxiliary function is activated according to a label in the auxiliary function. When the label exists in the auxiliary function, a system loading program is copied to a first address, a system program is copied to a second address, and a program video file is copied to a third address. The program video file comprises the specific program.

If the auxiliary function is de-activated, the CPU operates an office system according to the main BIOS (step S360). When the auxiliary function is activated, the CPU executes the specific program stored in the auxiliary module (step S330). In this embodiment, the specific program determines whether or not the computer system is abnormal. When the computer system is abnormal, the abnormal state is marked, a notice signal is issued from a speaker, or the abnormal state is displayed on a monitor (step S350). If the computer system is normal, the CPU operates the office system according to the specific program (step S360).

When the CPU finishes the booting action according to the main BIOS or the specific program, the same office system or different office systems are operated. For example, if the CPU finishes the booting action according to the main BIOS, the office system (Windows) is operated. If the CPU finishes the booting action according to the specific program, the office system operated can be a Windows or LINUX operating system.

Figure 4:
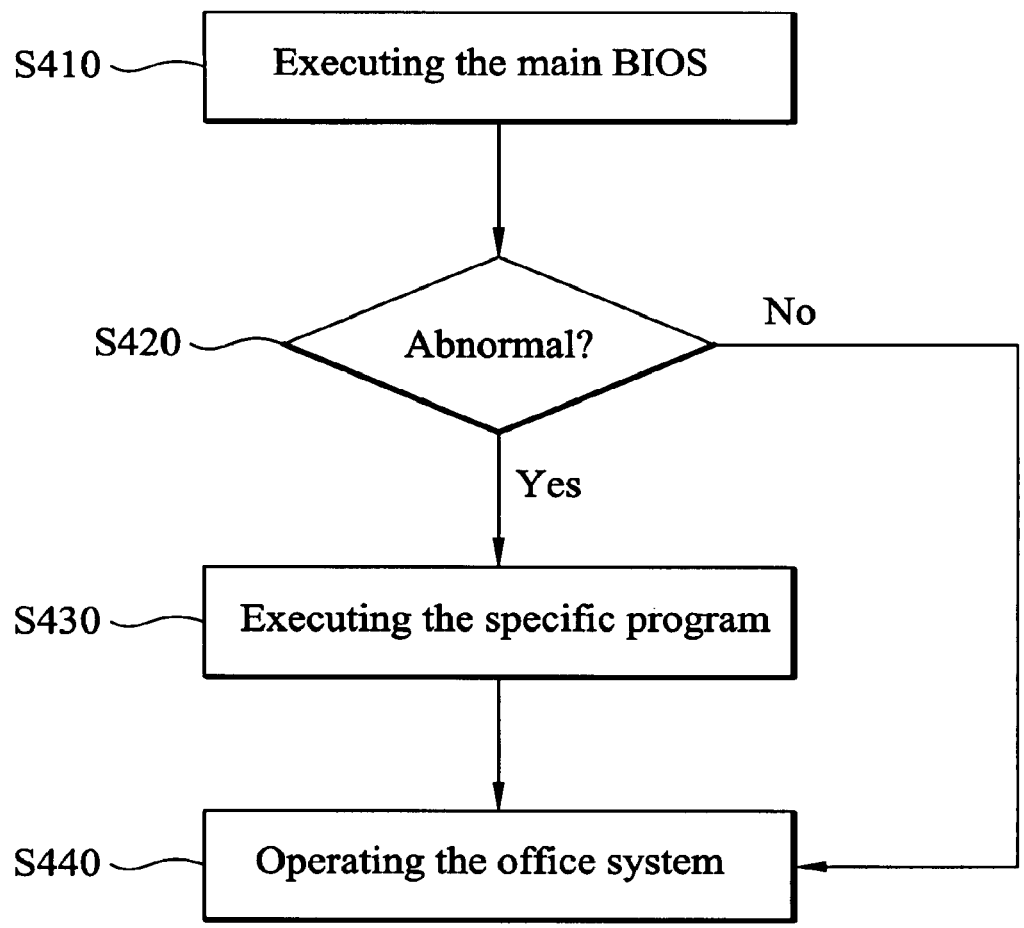
FIG. 4 is a flowchart of another exemplary embodiment of the control method.

Generally, the auxiliary function is activated by a user. However, the auxiliary function can be activated automatically. When the main BIOS cannot work normally, the auxiliary function is automatically activated. FIG. 4 is a flowchart of another exemplary embodiment of the control method. The main BIOS is executed (step S410). The main BIOS is detected (step S420). If the main BIOS is normal, the CPU executes the related functions according to the main BIOS for operating the office system (step S440). If the main BIOS is abnormal such that the CPU cannot execute the related functions according to the main BIOS, the specific program is executed (step S430). After executing the specific program, the office system is operated (step S440).

In some embodiment, assuming the CPU operates the office system according to the specific program. When the booting action is completed, the specific program is copied to the memory module and replaces the main BIOS. Thus, allowing the CPU to complete the booting action during a following booting session, based on the booting actions of the replaced main BIOS.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer system, comprising:
   a memory module storing a main base input/output system (BIOS) comprising an auxiliary function;
   a connection port connecting to an auxiliary module comprising at least one specific program; and
   a central processing unit (CPU) executing the main BIOS when the auxiliary function is de-activated and executing the specific program when the auxiliary function is activated, wherein the auxiliary module comprises a second slot for inserting a second memory chip storing a second application program, when executing the second application program, the CPU detects the computer system.

2. The computer system as claimed in claim 1, wherein the auxiliary module comprises a connection device for connecting to the connection port.

3. The computer system as claimed in claim 1, wherein the auxiliary module comprises at least one slot for inserting a memory chip storing a specific program.

4. The computer system as claimed in claim 1, wherein if the auxiliary module comprises a plurality of specific programs, the auxiliary module also comprises a plurality of slots for inserting a plurality of memory chips storing specific programs.

5. The computer system as claimed in claim 1, wherein the specific program comprises a system loading program, a system program, or an application program.

6. The computer system as claimed in claim 5, wherein the auxiliary module comprises a first slot for inserting a first memory chip storing a first application program, when executing the first application program, the CPU updates the main BIOS through a network.

7. The computer system as claimed in claim 1, wherein the auxiliary module marks an abnormal state or issues a notice signal when the computer is abnormal.

8. The computer system as claimed in claim 1, wherein when the CPU cannot execute a booting action according to the main BIOS, the auxiliary function is automatically activated such that the specific program executes the booting action.

9. The computer system as claimed in claim 8, wherein the specific program comprises a sub-BIOS.

10. The computer system as claimed in claim 9, wherein the sub-BIOS is copied to the memory module for replacing the main BIOS.

11. A control method for a computer comprising a main BIOS comprising an auxiliary function and a connection port connecting an auxiliary module comprising at least one specific program, comprising:
   executing the main BIOS;
   detecting whether the auxiliary function is activated; and
   executing the specific program when the auxiliary function is activated, wherein the specific program comprises a system loading program, a system program, or an application program, the auxiliary module comprises a second slot for inserting a second memory chip storing a second application program, and when executing the second application program, the CPU detects the computer system.

12. The control method as claimed in claim 11, wherein the auxiliary module comprises a connection device for connecting to the connection port.

13. The control method as claimed in claim 11, wherein the auxiliary module comprises at least one slot for inserting a memory chip storing the specific program.

14. The control method as claimed in claim 11, wherein if the auxiliary module comprises a plurality of specific programs, the auxiliary module also comprises a plurality of slots for inserting a plurality of memory chips storing specific programs.

15. The control method as claimed in claim 11, wherein the auxiliary module comprises a first slot for inserting a first memory chip storing a first application program, when executing the first application program, the CPU updates the main BIOS through a network.

16. The control method as claimed in claim 11, wherein the auxiliary module marks an abnormal state or issues a notice signal when the computer is abnormal.

17. The control method as claimed in claim 11, wherein when the CPU cannot execute a booting action according to the main BIOS, the auxiliary function is automatically activated such that the specific program executes the booting action.

18. The control method as claimed in claim 17, wherein the specific program comprises a sub-BIOS.

19. The control method as claimed in claim 18, wherein the sub-BIOS is copied to the memory module for replacing the main BIOS.

20. The control method as claimed in claim 11, wherein the detecting step comprises:
   copying a system loading program to a first address when a label of the auxiliary function occurs;
   copying a system program to a second address; and
   copying a program video file to a third address.

21. The control method as claimed in claim 20, wherein the program video file comprises the specific program.

* * * * *